US010735112B2

(12) United States Patent
Petra et al.

(10) Patent No.: US 10,735,112 B2
(45) Date of Patent: Aug. 4, 2020

(54) METHOD FOR ESTIMATING THE ELECTRIC FIELD STRENGTH IN A CELLULAR COMMUNICATION NETWORK

(71) Applicant: TELECOM ITALIA S.p.A., Milan (IT)

(72) Inventors: Massimiliano Petra, Turin (IT); Loris Paolo Stola, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 378 days.

(21) Appl. No.: 14/652,387

(22) PCT Filed: Dec. 21, 2012

(86) PCT No.: PCT/EP2012/076636
§ 371 (c)(1),
(2) Date: Jun. 15, 2015

(87) PCT Pub. No.: WO2014/094871
PCT Pub. Date: Jun. 26, 2014

(65) Prior Publication Data
US 2015/0333849 A1 Nov. 19, 2015

(51) Int. Cl.
*H04B 17/00* (2015.01)
*H04B 17/10* (2015.01)
*H04W 16/18* (2009.01)

(52) U.S. Cl.
CPC .......... *H04B 17/104* (2015.01); *H04W 16/18* (2013.01)

(58) Field of Classification Search
CPC .................................................. H04W 16/14
(Continued)

(56) References Cited

U.S. PATENT DOCUMENTS 5,689,812 A * 11/1997 Takahashi ............. H04W 16/18
342/360
6,021,316 A * 2/2000 Heiska .................. H04W 16/18
455/446

(Continued)

FOREIGN PATENT DOCUMENTS

WO 97/44977 A1 11/1997
WO 00/27149 A1 5/2000

OTHER PUBLICATIONS

Michael Nidd, et al., "Using Ray Tracing for Site-Specific Indoor Radio Signal Strength Analysis" Vehicular Technology Conference, vol. 2, pp. 795-799, (May 4, 1997), XP010228952.

(Continued)

*Primary Examiner* — Gary Lafontant
(74) *Attorney, Agent, or Firm* — Oblon, McClelland, Maier & Neustadt, L.L.P.

(57) ABSTRACT

A method for estimating the electric field strength associated to a radio wave emitted by an electromagnetic source of a cellular radio communication network within an area. The method includes: identifying a set of obstacles; determining at least one of: a direct visibility polygon of points in line of sight with the source; a reflection visibility polygon of points reachable by the wave after reflection by the obstacles; a diffraction visibility polygon of points reachable by the wave after diffraction by the obstacles. The visibility polygons are associated to respective values of the electric field computed therein. The method further includes: subdividing the area into pixels; for each pixel, determining if it belongs to at least one of the visibility polygons; and in the affirmative, determining the electric field strength at the pixel as a value proportional to the electric field computed at the at least one visibility polygon.

13 Claims, 12 Drawing Sheets

(58) Field of Classification Search
USPC .......................................................... 45/67.16
See application file for complete search history.

(56) References Cited

U.S. PATENT DOCUMENTS

| | | | |
|---|---|---|---|
| 6,188,913 B1 * | 2/2001 | Fukagawa | H01Q 3/2605 342/359 |
| 6,785,547 B1 | 8/2004 | Heiska et al. | |
| 2008/0161005 A1 | 7/2008 | Sato et al. | |

OTHER PUBLICATIONS

International Search Report dated Aug. 9, 2013 in PCT/EP12/076636 Filed Dec. 21, 2012.

* cited by examiner

METHOD FOR ESTIMATING THE ELECTRIC FIELD STRENGTH IN A CELLULAR COMMUNICATION NETWORK

TECHNICAL FIELD

The present invention generally relates to the field of cellular radio communication networks. In particular, the present invention relates to a method for estimating the electric field strength in a cellular radio communication network, more in particular in a cellular radio communication network comprising micro-cells.

BACKGROUND ART

As known, in an urban environment, a cellular radio communication network comprises micro-cells (typically, less than 2 kilometers wide) covering limited areas. The base station of a micro-cell is typically located few meters (e.g. 5 m) above the ground. This implies that the radio waves emitted by the antenna of the base station, in an urban environment, can encounter lots of obstacles along their propagation path, such obstacles being represented mainly by buildings.

Typically, as the base station is located at a height which is much lower that the average height of the buildings, the radio wave emitted by the base station can interact with the buildings along its propagation path towards a generic point within the micro-cell. In particular, the radio wave may reach a point within the micro-cell along a direct propagation path between the base station and the generic point (the so called direct visibility path) but also along other paths which originate from the interaction of the radio wave with the buildings. In particular, the radio wave emitted by the base station may reach a point within the micro-cell after having been reflected by the vertical walls of the buildings and/or having been diffracted by the edges of the buildings, both vertical edges and horizontal edges (i.e. the edges on the roof).

A known technique typically used to estimate the electric field strength produced by an antenna in a specific area is the so called "ray tracing" which is based on the electromagnetic theory of Geometric Optics or Ray Optics. According to this known technique, once the position of the antenna is fixed, to determine the electric field strength at a point P within the area, all the possible propagation paths of the rays originated from the antenna and reaching the point P are considered. The propagation paths can comprise the direct path between the antenna and the point P, and all the other paths originating from reflections and/or diffractions of the rays on the obstacles encountered during their propagation from the antenna to the point P. The propagation paths comprising indoor routes, i.e. routes inside the buildings, are excluded.

An alternative technique which may be used to estimate the electric field strength produced by an antenna in a specific area is the so called "ray launching" technique. Once the position of the antenna is fixed, this technique provides for determining rays propagating from the antenna along a set of angular directions spaced by a given angular step. Considering a given direction, the propagation path of each ray along this direction may comprise a direct path (when the ray does not encounter any obstacle along the considered direction) and paths originating from reflections and/or diffractions of the ray on the obstacles encountered during its propagation along the direction. The points where the electric field strength is computed are the points belonging to the propagation path of each single ray.

SUMMARY OF THE INVENTION

The inventors have noticed that in order to implement the ray tracing technique for estimating the electric field strength produced by an antenna inside a specific area, for instance the area of a micro-cell, all the propagation paths of the rays propagating between the antenna and the points within the area have to be taken into consideration. Indeed, as the ray tracing technique shows a degree of accuracy based on the spatial resolution of the points within the area to be investigated, assuming that said area is a micro-cell having a width of about 2-3 kilometers and that the dimension of each spatial point within the micro-cell (the so called "pixel") ranges from 1 m to 10 m, the number of points to be considered for estimating the electric field strength produced by the antenna in the micro-cell may range from about 40000 to 9 millions, depending on the requested accuracy.

The inventors have also noticed that while on the one hand the ray tracing technique may very accurately estimate the electric field strength, on the other hand its implementation may require a huge amount of computational resources, due to the high number of points to be handled in the computation of the electric field strength. This results in computing times that may be prohibitive.

As compared to the ray tracing technique, the ray launching technique requires a lower amount of computational resources to estimate the electric field strength in a micro-cell. However, the degree of accuracy obtained with this technique is lower than the degree of accuracy obtained with the ray tracing technique. Indeed, implementation of the ray launching technique does not guarantee that the electric field strength be computed in all the points of the area of interest, unless a very small angular step is chosen. In this case, however, the computation efficiency could be compromised.

The objective of the present invention is to improve the estimation of the electric field strength in a cellular radio communication network and, in particular, in a micro-cell of a cellular radio communication network in terms of both degree of accuracy and amount of needed computational resources.

According to a first aspect, the present invention provides a method for estimating the electric field strength associated to a radio wave emitted by an electromagnetic source of a cellular radio communication network within an area of investigation, the method comprising:
a) identifying a set of obstacles within the area of investigation;
b) determining at least one of:
   a direct visibility polygon as a polygonal region within the area comprising points which are in line of sight with the electromagnetic source;
   a reflection visibility polygon as a polygonal region within the area comprising points that may be reached by the radio wave after it has been reflected by at least one of the obstacles;
   a diffraction visibility polygon as a polygonal region within the area comprising points that may be reached by the radio wave after it has been diffracted by at least one of the obstacles; and
wherein the direct visibility polygon, the reflection visibility polygon and the diffraction visibility polygon are associated to respective values of the electric field computed therein,
c) subdividing the area of investigation into a set of pixels;

d) for each pixel of the set, determining if it belongs to at least one of the visibility polygons; and
e) in the affirmative, determining the electric field strength at the considered pixel as a value proportional to the value of the electric field computed at the at least one visibility polygon.

Preferably, step a) comprises:
associating to each of the obstacles a respective obstacle polygon, each obstacle polygon being a two-dimensional polygon whose perimeter corresponds to an external boundary of the corresponding obstacle,
computing, for each obstacle polygon a distance from the electromagnetic source, and
ordering the obstacle polygons according to increasing values of the computed distance.

Preferably, step a) further comprises,
determining a set of vertices for each of the obstacle polygons comprised within the area of investigation; and
ordering the vertices according to a direction along a boundary of the obstacle polygon.

Preferably, step b) comprises determining one or more visible sides of the obstacle polygons, each one of the visible sides being a side in line of sight with the electromagnetic source.

Preferably, the at least one direct visibility polygon is determined by:
computing, for each visible side of the obstacle polygons, that is in line of sight with the electromagnetic source a shadow region as the region of points that are not visible from the electromagnetic source due to the considered visible side;
determining the direct visibility polygon as the region of points which do not belong to any one of the shadow region.

Profitably, computing is performed by considering the obstacle polygons according to increasing values of their distance from the electromagnetic source.

Preferably, the at least one reflection visibility polygon is determined by:
determining, for each one of the visible sides, an image source located at a position which is symmetric to the position of the electromagnetic source with respect to the considered visible side;
determining a fictitious shadow region as the region of points that are not visible from the image source due to the considered visible side;
determining, in the fictitious shadow region sides or portions of sides of the obstacle polygons that are visible from the image source;
for each one of the identified sides or portions of side visible from the image source, determining a further fictitious shadow region as the region of points that are not visible from the image source due to the considered side or portion of side; and
determining the reflection visibility polygon as the region of points of the fictitious shadow region which do not belong to the further fictitious shadow regions.

Preferably, the at least one diffraction visibility polygon is determined by:
identifying at least one diffraction edge of at least one of the obstacle polygons;
associating the diffraction edge to an equivalent electromagnetic source;
determining at least one visible side of the obstacle polygons that is in line of sight with the equivalent electromagnetic source;
computing, for the at least one visible side of the obstacle polygons, a shadow region as the region of points that are not visible from the equivalent electromagnetic source due to the at least one visible side;
determining the diffraction visibility polygon as the region of points which do not belong to the shadow region.

According to an embodiment, identifying comprises identifying the at least one diffraction edge as an edge between two sides of an obstacle polygon forming a convex angle lower than 150°.

Preferably, the method further comprises displaying a map of the computed electric field strength inside the investigation area.

According to a second aspect, the present invention provides a system for estimating the electric field strength associated to a radio wave emitted by an electromagnetic source of a cellular radio communication network within an area of investigation, the system comprising a processing module configured for
identifying a set of obstacles within the area of investigation;
determining at least one of:
a direct visibility polygon as a polygonal region within the area comprising points which are in line of sight with the electromagnetic source,
a reflection visibility polygon as a polygonal region within the area comprising points that may be reached by the radio wave after it has been reflected by at least one of the obstacles;
a diffraction visibility polygon as a polygonal region within the area comprising points that may be reached by the radio wave after it has been diffracted by at least one of the obstacles;
wherein the direct visibility polygon, the reflection visibility polygon and the diffraction visibility polygon are associated to respective values of the electric field computed therein,
subdividing the area of investigation into a set of pixels;
for each pixel of the set, determining if it belongs to at least one of the visibility polygons; and
in the affirmative, determining the electric field strength at the considered pixel as a value proportional to the value of the electric field computed at the at least one visibility polygon.

Preferably, the system further comprises an output module configured to provide a map of the computed electric field strength inside the investigation area.

According to a third aspect, the present invention provides a computer program product comprising computer-executable instructions for performing, when the program is run on a computer, the steps of the method as set forth above.

BRIEF DESCRIPTION OF THE DRAWINGS

Embodiments of the invention will be better understood by reading the following detailed description, given by way of example and not of limitation, to be read with reference to the accompanying drawings, wherein.

DETAILED DESCRIPTION OF PREFERRED EMBODIMENTS OF THE INVENTION

Figure 1:
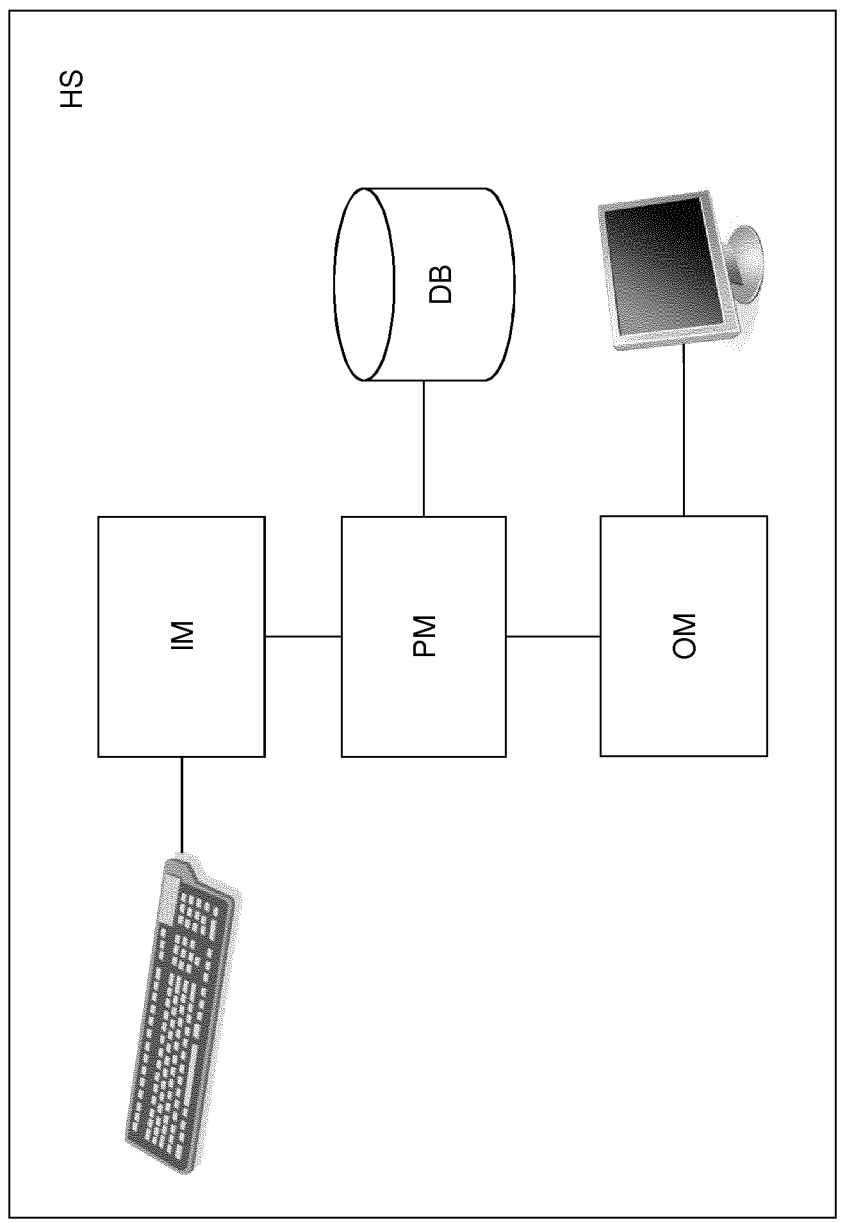
FIG. 1 is a schematic block diagram of a system for estimating the electric field strength according to embodiments of the present invention.

FIG. 1 is a block diagram showing a hardware system HS for estimating the electric field strength in a cellular communication network, in particular in a micro-cell of a cellular communication network, according to embodiments of the present invention. Preferably, the system HS comprises an input module IM, a processing module PM, a database DB and an output module OM. Preferably, the system HS further comprises a display, connected to the output module OM. The system HS may also comprise an input peripheral connected to the input module IM, such as a keyboard.

The hardware system HS may be for example a programmed computer comprising program and data storage devices, e.g. digital storage media such as hard-drives or optically readable digital storage media. The storage devices are machine- or computer-readable and encode machine-executable or computer-executable programs of instructions where the instructions perform some or all of the steps of the method described in the following.

Figure 2:
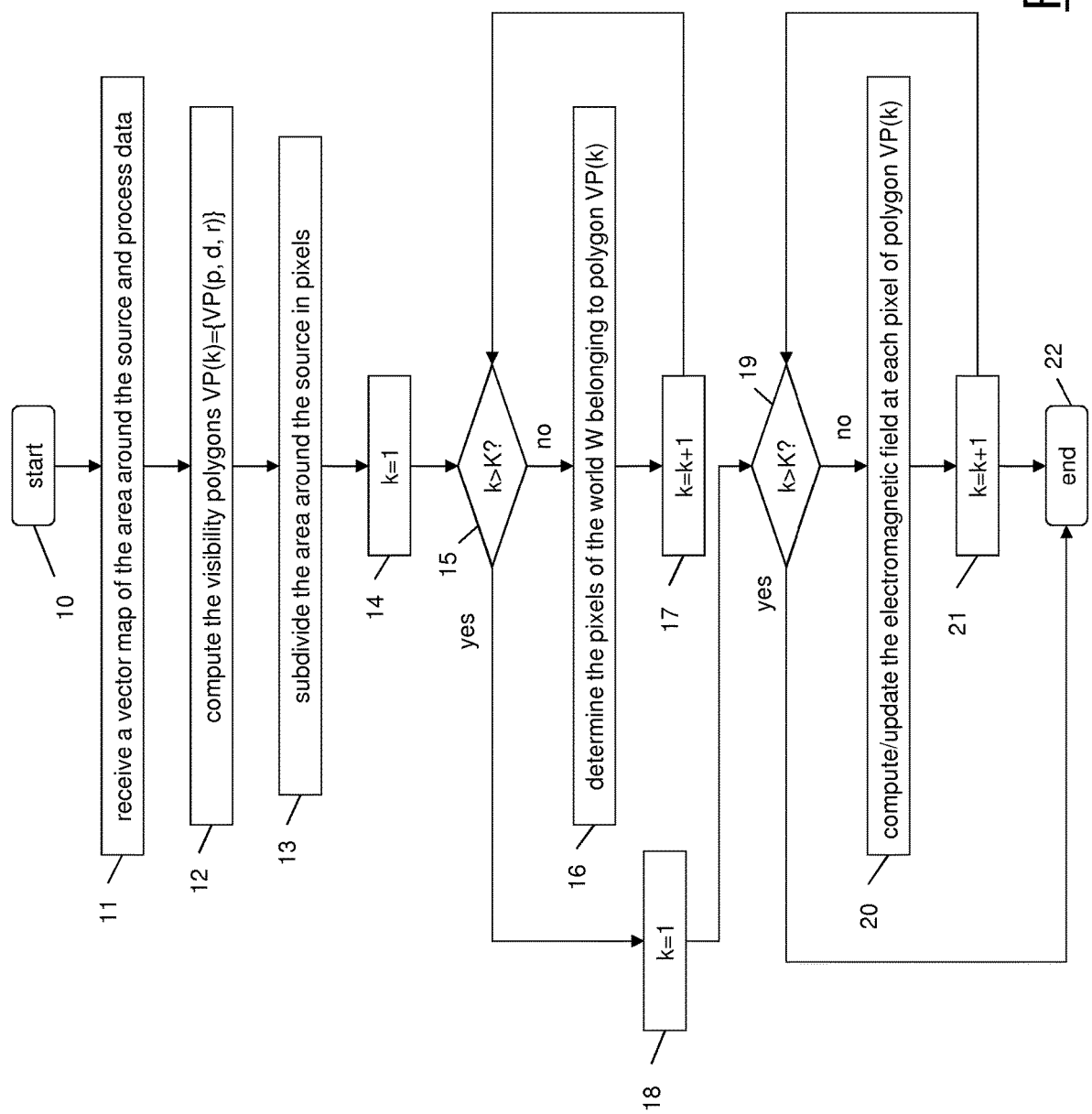
FIG. 2 is a flow chart of the steps of an embodiment of the method for estimating the electric field strength according to the present invention.

FIG. 2 is a flow chart illustrating the steps of the method carried out by the hardware system HS according to an embodiment of the present invention. The method is intended to estimate the electric field strength produced by an electromagnetic source, such as for instance a base station, in a specific area such as, for instance, a urban cell of a cellular radio communication network or a urban micro-cell of a micro-cellular radio communication network or a portion thereof. The area of investigation may comprise a number of obstacles, such as for instance buildings.

With reference to FIG. 2, the method according to the present invention starts (step 10) with a first step 11 in which the input module IM preferably receives information about the electromagnetic source. Such information may be, for example, input into the hardware system HS by an operator through the input peripheral.

Figure 5:
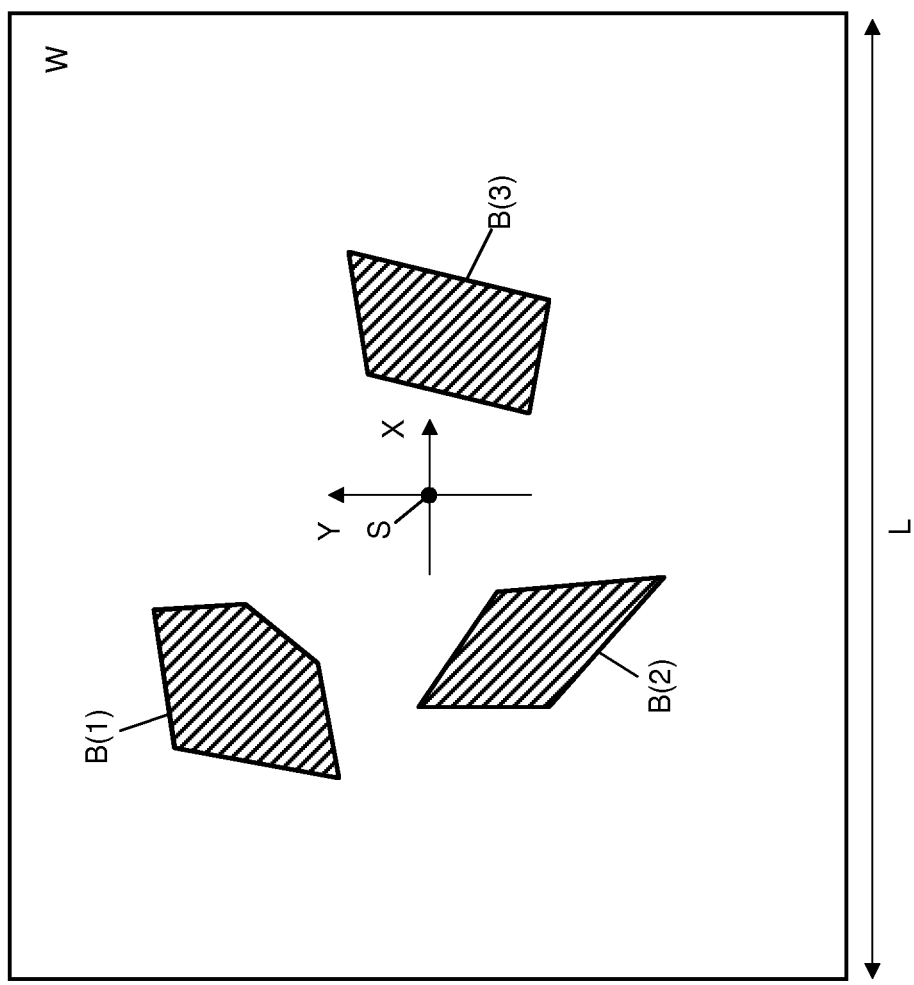
FIG. 5 is a plan view of an exemplary area of investigation.

More specifically, at the first step 11, the input module IM receives information comprising the geographic coordinates (i.e. latitude and longitude) of the electromagnetic source and a vector map of the area around the electromagnetic source. The data of the vector map may be loaded into the input module IM by connecting the hardware system HS to an external database comprising such data (e.g. an external hard disk or a database stored on an external server connectable to the hardware system HS by means of the Internet). Such a vector map can comprise a set of information including the geographical coordinates (i.e. latitude and longitude) of the ground vertices of the area and the geographic coordinates of the ground vertices of the obstacles located within the area. The input module IM then forwards the received information to the processing module PM which converts the geographic coordinates of the electromagnetic source and the geographic coordinates of the vertices into Cartesian coordinates within a Cartesian plane. The Cartesian plane has its center at the position of the electromagnetic source, an horizontal axis X and a vertical axis Y and it is defined on the two-dimensional plane of a section of the area around the electromagnetic source perpendicular to the obstacles, e.g. on the ground, on which obstacles are considered having an infinite height. In FIG. 5, an electromagnetic source S is shown together with the horizontal axis X and the vertical axis Y mentioned above.

During step 11, the input module IM may also receive data concerning the electromagnetic properties of the electromagnetic source. Such information can comprise the power transmitted by the electromagnetic source S, the wavelength of the emitted radio wave, the radiation pattern. This information will be used to compute the electric field strength within the area around the electromagnetic source, as it will be described in more detail herein after.

The vector map and the data concerning the electromagnetic properties of the electromagnetic source are preferably store in the database DB.

The data received by the input module IM are processed by the processing module PM according to sub-steps 110-116 of step 11. Sub-steps 110-116 are illustrated in the flow chart of FIG. 3.

Specifically, the procedure starts (sub-step 110) with a first sub-step 111 in which the portion of the area around the electromagnetic source that, in absence of obstacles, is reached by the radio wave emitted by the electromagnetic source is determined. In the following, it will be designated as "world". Preferably, the world is determined as the area around the electromagnetic source comprised within a square polygon having its center at the position of the electromagnetic source and side length L, as shown in FIG. 5. In FIG. 5, the world associated with the electromagnetic source S is designated with "W". It should be noted that the shape of the world W is not limited to the one described above. The world W may have any shape, for example, a circular shape. The side length L is chosen on the basis of the characteristics of the area around the electromagnetic source S, and, in particular, on the basis of the density of the obstacles within said area. If, for instance, the electromagnetic source S is located within an urban area with a high density of buildings, the side length L preferably ranges from about 0.5 kilometers to about 2 kilometers. If the electromagnetic source S is located in a sub-urban area with few buildings, the side length L preferably ranges from about 2 kilometers to about 10 kilometers.

During sub-step 112, the obstacles, typically buildings, comprised within the world W are identified. It is assumed, for sake of generalization, that the world W comprises a number N of obstacles B. For instance, in FIG. 5, the plan view of an exemplary world W is shown in which three buildings (N=3), namely B(1), B(2) and B(3), are present.

During sub-step 113, each obstacle located within the world W is associated to a respective two-dimensional polygon P(i), i=1, ..., N whose perimeter corresponds to the external boundary of the obstacle. In the following description and in the claims, such polygon will be referred to as "obstacle polygon". Moreover, for each obstacle polygon P(i) a respective array of vertices $V_i$ is determined, such array comprising the set of the vertices of the corresponding obstacle's boundary, in Cartesian coordinates. During sub-step 113, an array of vertices $V_0$ is also determined comprising the set of the vertices of the world's boundary.

The Cartesian coordinates of the arrays of vertices $V_i$ and $V_0$ are preferably stored in the database DB.

At sub-step 114, each array of vertices $V_i$ is ordered so as to define a direction along the boundary of the corresponding obstacle polygon P(i). Specifically, one vertex within each array $V_i$ is chosen to be the "first vertex" of the corresponding obstacle polygon P(i). This vertex will be designated herein after as $V_i(1)$, i=1, . . . , N. The other vertices are then ordered according to a same direction, for example a clockwise direction, along the boundary of the corresponding obstacle polygon. Alternatively, the vertices may be ordered according to a counter-clockwise direction. The direction according to which the vertices are ordered is preferably the same for all the obstacle polygons P(i). The vertices $V_0$ belonging to the boundary of the world W are ordered accordingly.

Figure 6:
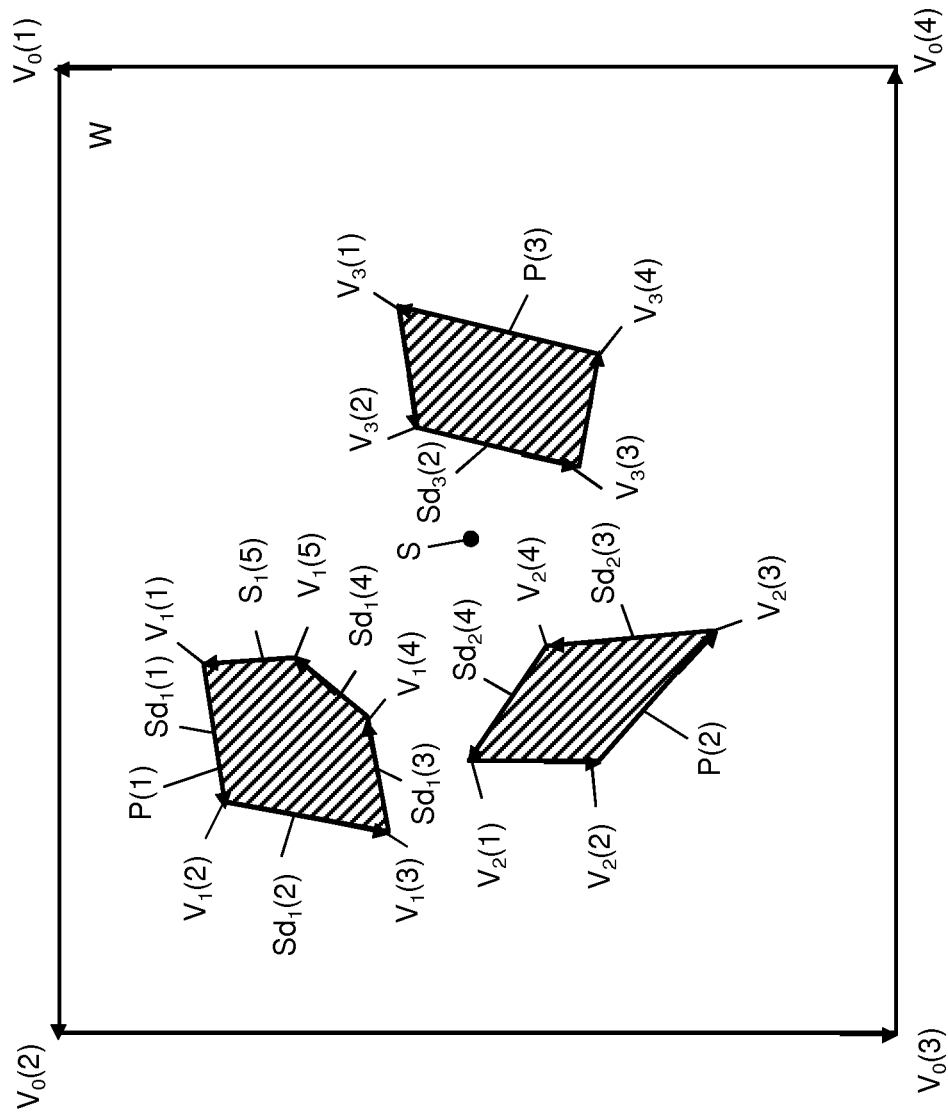
FIG. 6 shows obstacle polygons belonging to the area of FIG. 5 after than an orientation is imposed on their vertices.

FIG. 6 shows the exemplary world W of FIG. 5 and the obstacle polygons P(i), i=1, 2, 3 corresponding to the buildings B(1), B(2), B(3). Moreover, FIG. 6 shows the vertices of each obstacle polygon P(i) and the vertices of the world W. For instance, obstacle polygon P(1), which corresponds to building B(1), comprises five vertices $V_1(j)$, j=1, 5, i.e. $V_1(1)$, $V_1(2)$, $V_1(3)$, $V_1(4)$ and $V_1(5)$; obstacle polygon P(2), which corresponds to building B(2), comprises four vertices $V_2(j)$, j=1, . . . , 4, i.e. $V_2(1)$, $V_2(2)$, $V_2(3)$ and $V_2(4)$; obstacle polygon P(3), which corresponds to building B(3), comprises four vertices $V_3(j)$, j=1, . . . , 4, i.e. $V_3(1)$, $V_3(2)$, $V_3(3)$ and $V_3(4)$. The four vertices of the world W are designated as $V_0(1)$, $V_0(2)$, $V_0(3)$ and $V_0(4)$. In FIG. 6, the direction according to which the vertices of the boundary of the world W and the vertices of the boundary of each obstacle polygon P(i) are ordered is represented by arrows. In the exemplary scenario of FIG. 6, the vertices of the boundary of the world W and the vertices of the boundary of each polygon P(i) are ordered according to a counter-clockwise direction.

At sub-step 115, the distance between each obstacle polygon P(i) and the electromagnetic source S is computed. Preferably, this distance is computed as the Euclidean distance between the electromagnetic source S and one of the vertices of the boundary of the obstacle polygon P(i), said vertex being the boundary's vertex closest to the electromagnetic source S. The obstacle polygons P(i) are then ordered in the Cartesian plane according to the value of their distance from the electromagnetic source S. In particular, they are ordered according to increasing values of the distance from the electromagnetic source S.

At sub-step 115, an array of sides $Sd_i$ for each obstacle polygon P(i) is also determined by the processing module PM. The first side within each array $Sd_i$ is determined as the side that comprises the first vertex $V_i(1)$ of the corresponding obstacle polygon P(i) and the vertex adjacent to the first vertex along the boundary of the polygon, according to the direction determined at sub-step 114. The other sides are determined and numbered in the same way. In FIG. 6, for instance, the sides of the obstacle polygon P(1) are shown. Obstacle polygon P(1) comprises five sides $Sd_1(1)$, $Sd_1(2)$, $Sd_1(3)$, $Sd_1(4)$ and $Sd_1(5)$. The order according to which the sides are numbered follows the counter-clockwise direction.

Each side is associated to a couple of consecutive vertices of the corresponding obstacle polygon P(i), namely a tail vertex and a head vertex along the direction according to which the vertices are ordered. For instance, according to the schematic representation of FIG. 6, the tail vertex of side $Sd_1(1)$ is vertex $V_1(1)$ and the head vertex of side $Sd_1(1)$ is vertex $V_1(2)$.

Figure 3:
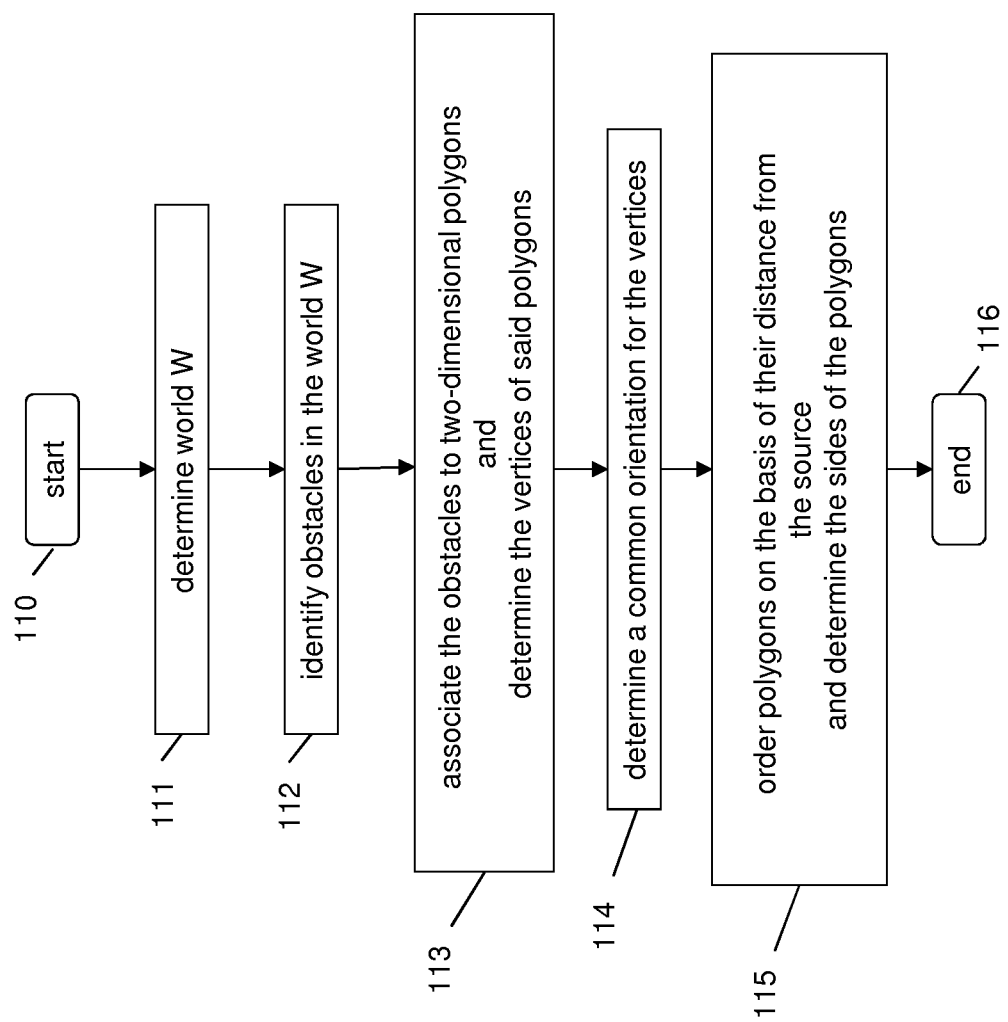
FIG. 3 is a flow chart illustrating in more detail one step of the method of FIG. 2.

The procedure shows in FIG. 3 ends at sub-step 116.

Referring back to the flow chart of FIG. 2, at step 12, the processing module PM determines a set of visibility polygons, as it will be described herein after.

Firstly, the processing module PM groups the sides of each obstacle polygon P(i) in two categories: a first category comprising the sides that are visible from the position of the electromagnetic source S and a second category comprising the sides that are not visible from the position of the electromagnetic source S. In the following, the expressions "side visible from the position of the electromagnetic source" or "side visible from the electromagnetic source" or simply "visible side" will indicate a side that is "in line of sight" with the electromagnetic source (i.e. the rays emitted by the electromagnetic source do not encounter any obstacle along their propagation path from the electromagnetic source to the considered side).

For determining the sides of the obstacle polygons P(i) that are visible from the electromagnetic source S the processing module PM preferably applies a known technique called "back face culling". According to this technique, it is determined that a side (having a counter-clockwise direction) is visible from the position of the electromagnetic source S if, provided that the source S and the tail vertex of the side belong to a first straight line and that the source S and the head vertex of the side belong to a second straight line, the rotation that would bring the first straight line towards the second straight line is a clockwise rotation. On the other hand, a side (having a counter-clockwise orientation) is not visible from the position of the source S if the rotation that would bring the first straight line towards the second straight line is a counter-clockwise rotation.

The processing module PM applies the back face culling technique iteratively for each obstacle polygon P(i) within the world W, starting from the obstacle polygon P(i) closest to the source, and determines a total number M of sides visible from the electromagnetic source S. In the exemplary scenario of FIG. 6, the number of the sides visible from the electromagnetic source S is six (M=6), namely sides $Sd_1(3)$, $Sd_1(4)$ and $Sd_1(5)$ of obstacle polygon P(1), sides $Sd_2(3)$ and $Sd_2(4)$ of obstacle polygon P(2), and side $Sd_3(2)$ of obstacle polygon P(3).

Successively, the processing module PM determines the set of visibility polygons.

The set of visibility polygons preferably comprises:
a direct visibility polygon;
a number of reflection visibility polygons; and
a number of diffraction visibility polygons.

In order to determine the visibility polygons, it is assumed that the electromagnetic source S can emit an infinite number of rays representing a propagating radio wave. It is also assumed that each ray may propagate in the world W and in particular in the space between the obstacles B along straight propagation paths. As already mentioned above it is further assumed that the obstacles have infinite height and that reflections occur only on the vertical sides of the obstacles and diffractions occur at the vertical edges of the obstacles.

In the following, for direct visibility polygon it is intended a polygonal region within the world W comprising the points which are in line of sight with the electromagnetic source S, i.e. all points that may be reached by the radio wave emitted by the electromagnetic source S along a direct propagation path (without encountering any obstacle).

In the following, for reflection visibility polygon it is intended a polygonal region within the world W comprising all the points that may be reached by the radio wave emitted by the electromagnetic source S after it has been reflected one or more times by the visible sides of the obstacle polygons P(i) inside the world W. Specifically, a reflection visibility polygon having order of reflection r (referred to in the following as "reflection visibility polygon of order r") is a polygonal region comprising all the points of the world W that may be reached by the radio wave after it has undergone an integer number r of reflections on the visible sides belonging to one or more obstacle polygons P(i) inside the world W.

More specifically, a reflection visibility polygon having order of reflection r equal to one (referred to in the following as "first order reflection visibility polygon") is a polygonal region comprising all the points of the world W that may be reached by the radio wave after it has undergone one reflection on one visible side belonging to one of the obstacle polygons P(i). Then, a reflection visibility polygon having order of reflection r equal to two (referred to in the following as "second order reflection visibility polygon") is a polygonal region comprising all the points of the world W that may be reached by the radio wave after it has undergone two reflections on two visible sides belonging to a single obstacle polygon P(i) or to two different obstacle polygons P(i). The reflection visibility polygons having order of reflection higher than two are defined in a similar manner by considering a higher number of reflections on the visible sides.

A diffraction visibility polygon is a polygonal region within the world W comprising all the points that may be reached by the radio wave emitted by the electromagnetic source S after it has been diffracted at an edge of an obstacle polygon P(i) (and then possibly reflected by one or more of the obstacle polygons' visible sides).

The visibility polygons will be designated using the notation VP(p, d, r) wherein index d is an integer number that indicates the number of diffractions that will be taken into consideration and the index r is the order of reflection. The further index p is an incremental integer number designating, for each different combination of values of the indices d and r, the different visibility polygons computed by considering d diffractions and r consecutive reflections within the world W, as it will be explained in greater detail herein after.

Preferably, the processing module PM determines firstly the direct visibility polygon. The direct visibility polygon is indicated with the notation VP(0, 0, 0) and is determined according to an iterative procedure that will be described in the following.

Preferably, the obstacle polygon P(i) closest to the electromagnetic source S is firstly considered. Then, each visible side belonging to this obstacle polygon is taken into consideration and, for each visible side, a shadow region is determined as the region of points that are not visible from the electromagnetic source S due to that side. Next, the visible sides of the other obstacle polygons P(i) which are at an increasing distance from the electromagnetic source S are considered, and the procedure described above is repeated for each of these obstacle polygons. When all the obstacle polygons P(i) have been considered, the direct visibility polygon VP(0, 0, 0) is determined as the region of points of the world W which does not belong to any one of the shadow regions associated to the considered visible sides.

By firstly considering the obstacle polygon which is closest to the electromagnetic source and then the obstacle polygons P(i) at increasing distances makes the computation of the direct visibility polygon VP(0, 0, 0) more efficient. In fact, depending on their distance from the electromagnetic source, the obstacle polygons shade regions of the world W which are smaller and smaller as their distance from the electromagnetic source increases. As a consequence, the obstacle polygon which is closest to the electromagnetic source will shade more obstacle polygons than the obstacle polygons at increasing distances. According to the present invention these shadowed obstacle polygons are not further taken into account in the computation of the direct visibility polygon VP(0, 0, 0). In this way the time and the computational resources needed for determining the direct visibility polygon VP(0, 0, 0) are reduced.

Figure 7A:
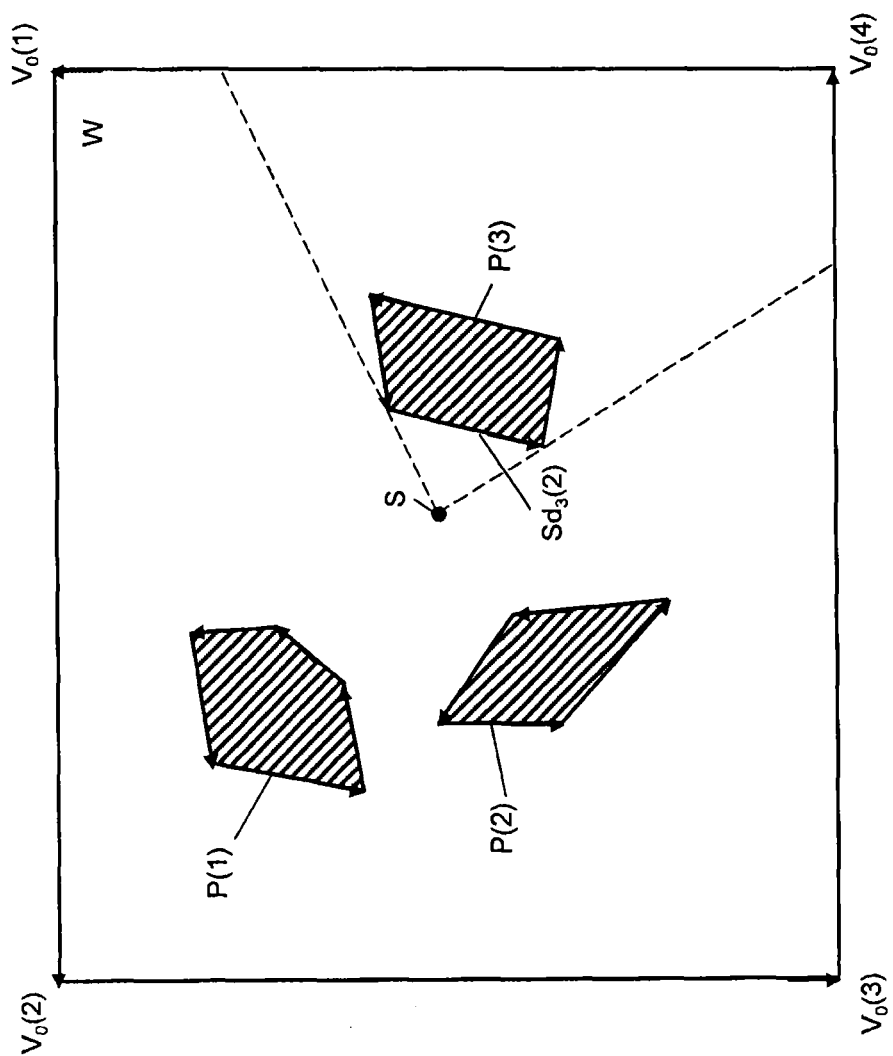
FIGS. 7A and 7B illustrate the step of determining a direct visibility polygon.
Figure 7B:
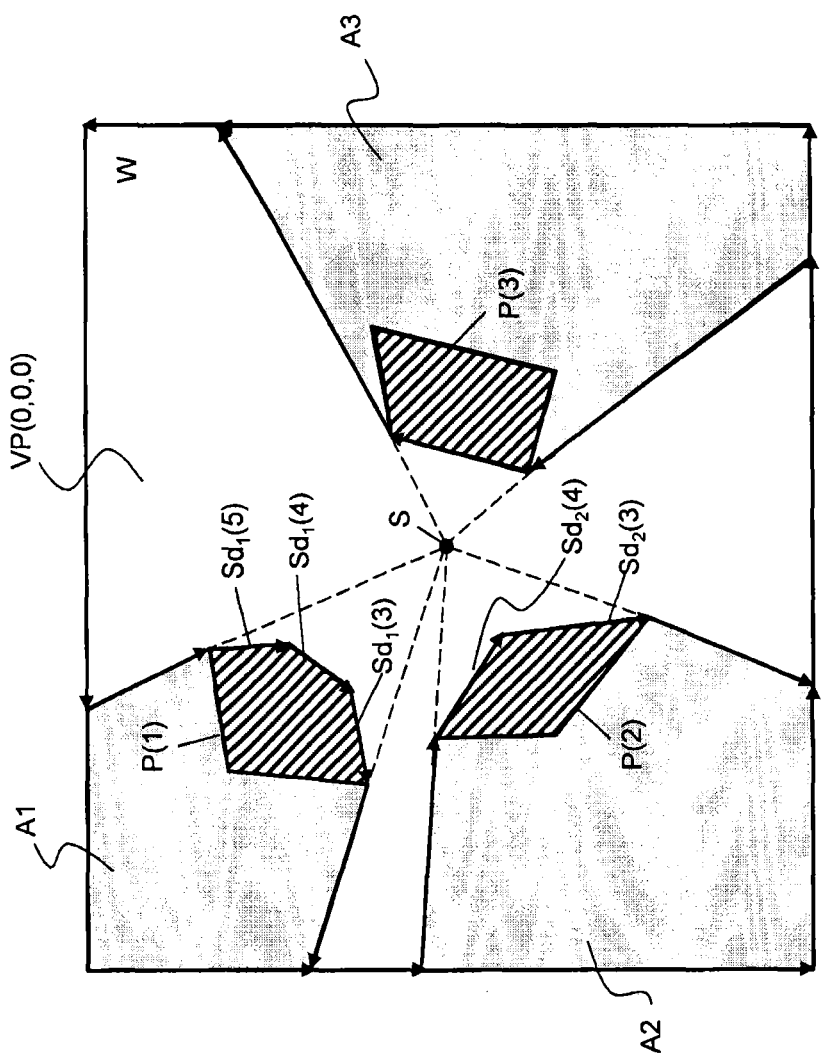

According to the exemplary scenario of FIG. 6, it is assumed that the obstacle polygon closest to the electromagnetic source S is the obstacle polygon P(3). Obstacle polygon P(3) comprises a single visible side, namely side $Sd_3(2)$. With reference to FIG. 7A, in order to geometrically represent the shadow region associated to the visible side $Sd_3(2)$, a first straight line is projected from the position of the electromagnetic source S to the boundary of the world W, said first straight line going through the tail vertex of the visible side $Sd_3(2)$. Then, a second straight line is projected from the position of the electromagnetic source S to the boundary of the world W, said second straight line going through the head vertex of the visible side $Sd_3(2)$. As represented in FIG. 7B, the first and the second straight lines, the visible side $Sd_3(2)$ and the boundary of the world W define the shadow region associated to the visible side $Sd_3(2)$ (the gray area A3 in FIG. 7B). As stated above, this region comprises all the points of the world W that are not visible from the position of the electromagnetic source S due to the presence of the side $Sd_3(2)$.

The procedure described above for the side $Sd_3(2)$ is then repeated by the processing module PM for the other obstacle polygons P(1) and P(2) of the world W and finally the direct visibility polygon VP(0, 0, 0) is determined as the polygonal region shown in FIG. 7B with white background and having sixteen vertices and sixteen sides. The gray areas A1 and A2, shown in FIG. 7B, represent the shadow regions associated with the visible sides of polygons P(1) and P(2), respectively.

Then, the processing module PM identifies the vertices of the direct visibility polygon VP(0, 0, 0). Specifically, a first vertex of the direct visibility polygon VP(0, 0, 0) is identified and the other vertices are ordered so as to define a counter-clockwise direction along the boundary of the polygon (as represented by the arrows shown in FIG. 7B).

After having determined the direct visibility polygon VP(0, 0, 0), the processing module PM then determines (step 120 of the flow chart of FIG. 4) the reflection visibility polygons.

Figure 4:
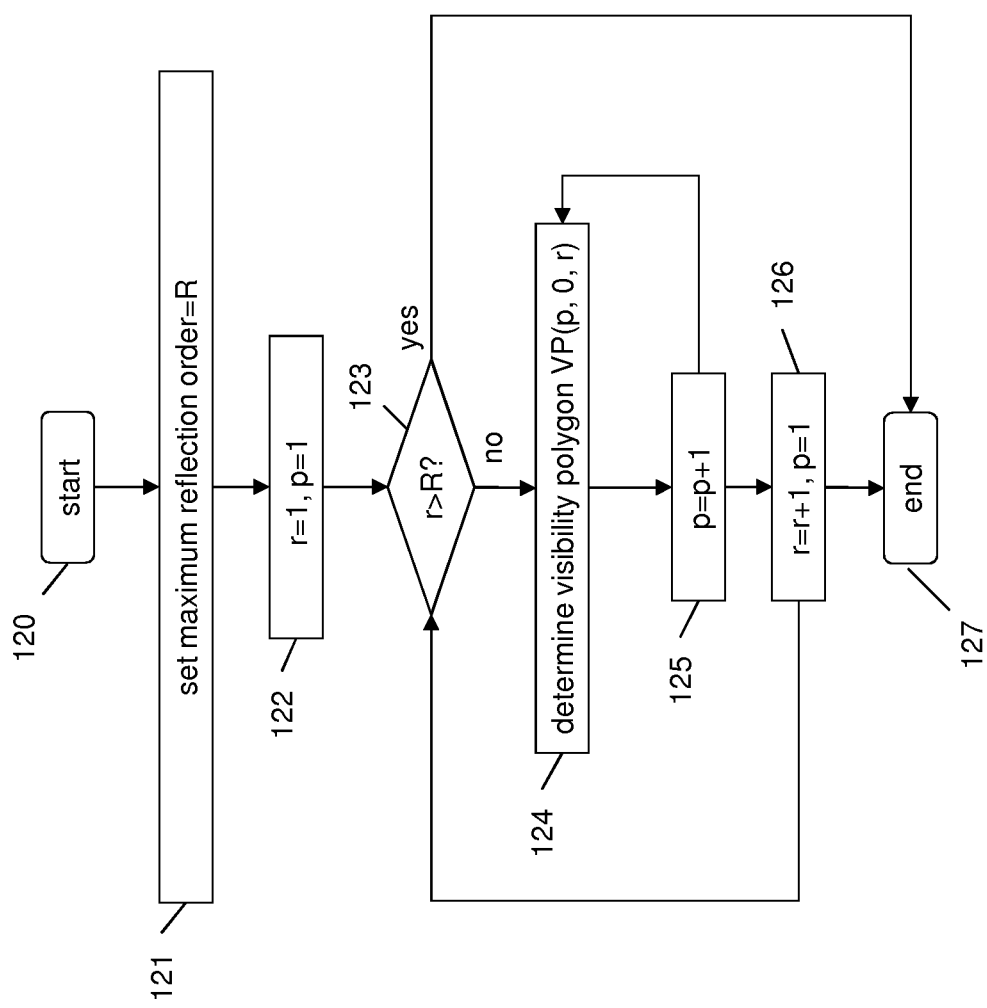
FIG. 4 is a flow chart illustrating in more detail another step of the method of FIG. 2.

With reference to FIG. 4, firstly, a maximum order of reflection of the radio wave emitted by the electromagnetic source S on the visible sides of the obstacle polygons is preferably set to a pre-determined integer number R equal to or higher than one (sub-step 121). For obtaining a good compromise between the degree of accuracy and the need to minimize the computation times and the amount of memory resources requested for determining the electric field strength, the inventors have found that the integer number R may range from 5 to 10. The integer number R is preferably input into the hardware system HS by the operator through the input peripheral.

Then, the processing module PM determines the first order reflection visibility polygons and successively it determines the other reflection visibility polygons with increasing order of reflection.

The visible sides of the obstacle polygon P(i) closest to the electromagnetic source S are first considered one by one.

With reference to FIG. 4, at sub-step 122 indexes r and p are set equal to 1.

At step 123, the processing module PM verifies if the condition r>R is satisfied. If the condition r>R is not satisfied (branch "no" of step 123) as the case of r=1, the processing module PM performs sub-step 124.

It should be noted that sub-step 124 is performed each time a new visible side is considered. Specifically, at sub-step 124, the first order reflection visibility polygon VP(1, 0, 1) is determined as the region of points "visible" from the electromagnetic source S after the emitted radio wave has undergone a reflection on the first visible side of the obstacle polygon P(i) closest to the electromagnetic source. In the exemplary scenario of FIG. 6, the obstacle polygon closest to the electromagnetic source is polygon P(3). It has only one visible side, namely side $Sd_3(2)$. In particular, an image source S' of the electromagnetic source S is determined as being located at a position which is symmetric to the position of the electromagnetic source S with respect to the considered visible side. Then, a fictitious shadow region is determined as the region of points that are not visible from the image source S' due to that side. Such a region may comprise the other obstacle polygons P(i) included in the world W or portions thereof, or it may not comprise any portion of the obstacle polygons P(i). In this last case, the first order reflection visibility polygon VP(1, 0, 1) corresponds to the entire fictitious shadow region. In case obstacle polygons or portions of obstacle polygons are included in the fictitious shadow region so determined, the first order reflection visibility polygon VP(1, 0, 1) is computed as follows:

a) in said fictitious shadow region, the sides, or portions of sides, (except the considered visible side) of the obstacle polygons P(i) or of the portions of obstacle polygons P(i) which would be visible from the image source S' by applying the "back face culling" technique are determined;
b) for each side or portion of side visible from the image source S', a further fictitious shadow region is determined as the region of points that are not visible from the image source S' due to that side; and
c) the first order reflection visibility polygon VP(1, 0, 1) is determined as the region of points of said fictitious shadow region which does not belong to the further fictitious shadow region(s) determined at point b.

Successively, the vertices of the first order reflection visibility polygon VP(p, 0, 1) are identified. Specifically, a first vertex is arbitrarily chosen and the other vertices are preferably ordered according to a given, e.g. a counter-clockwise, direction along the boundary of the polygon.

At sub-step 125 index p is increased (index p is increased each time a new visible side is considered) and the procedure for determining the first order reflection visibility polygons VP(p, 0, 1) above described is repeated for all the visible sides of the obstacle polygon P(i) closest to the electromagnetic source S and successively for all the visible sides of the other obstacle polygons P(i), inside the world W, that are at increasing distances from the electromagnetic source S, until all the visible sides inside the world W are taken into account. At the end of the iterative procedure, the number of first order reflection visibility polygons VP(p, 0, 1) so determined is equal to M (p=1, . . . , M), where M corresponds to the number of visible sides within the world W.

Figure 8A:
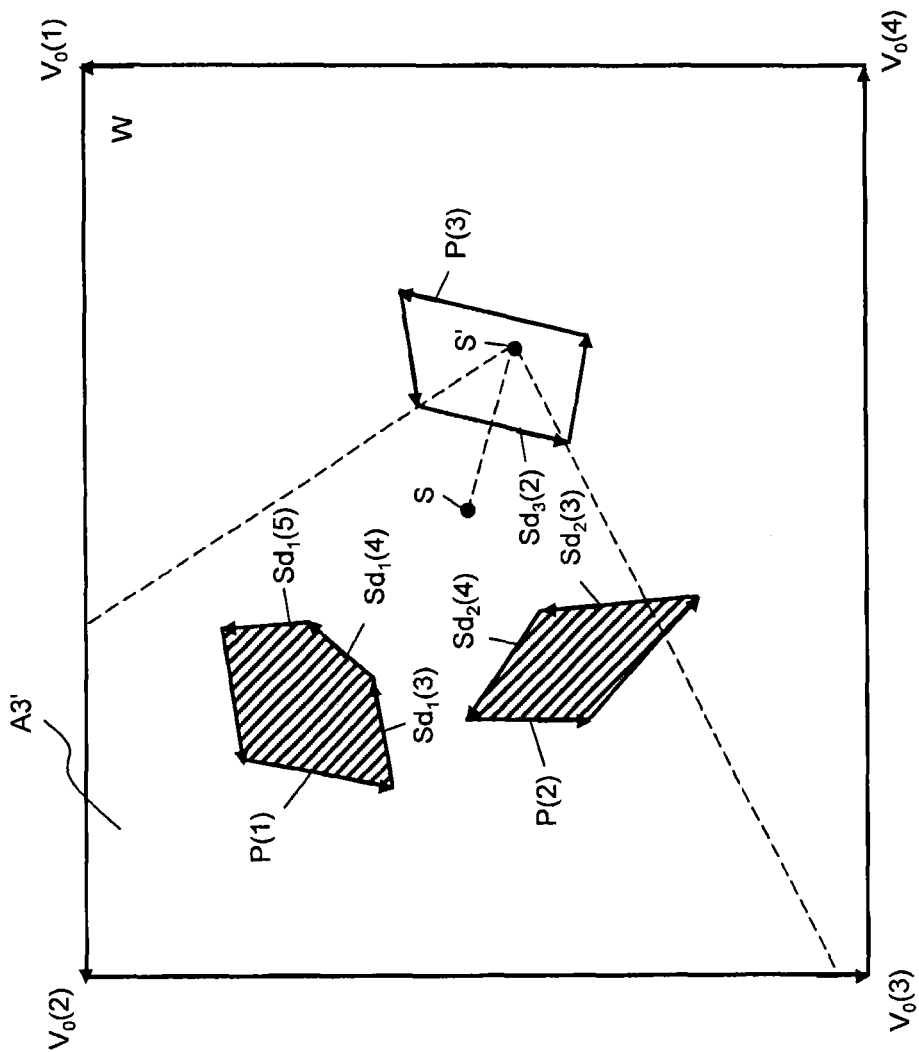
FIGS. 8A, 8B and 8C illustrate the step of determining the first order reflection visibility polygons.
Figure 8B:
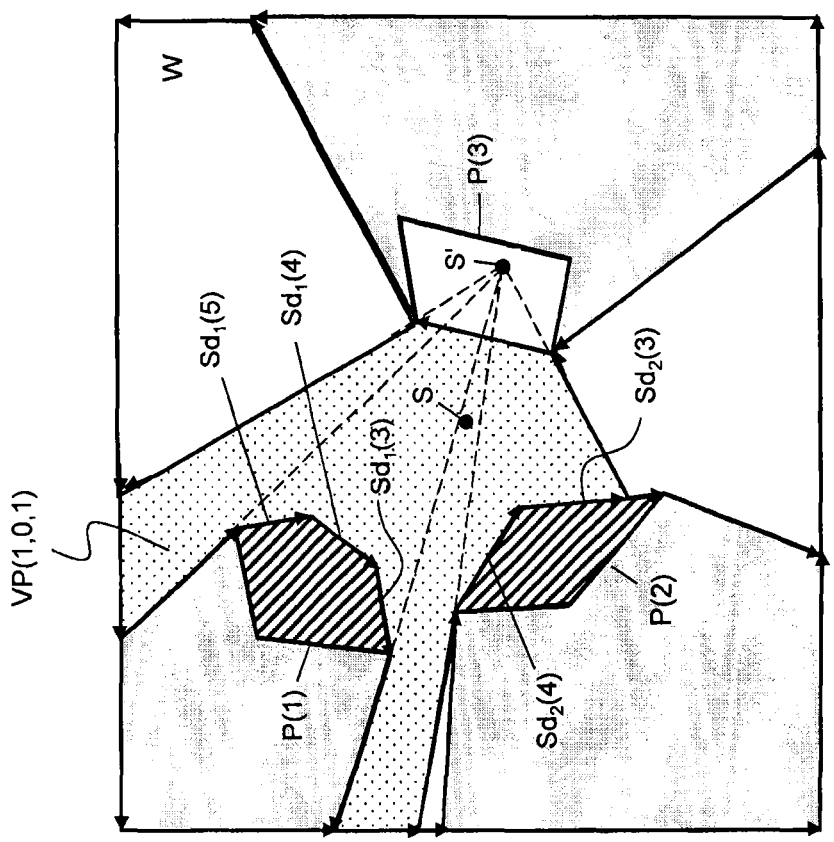

In the exemplary scenario of FIG. 6, it is assumed that the obstacle polygon P(i) closest to the electromagnetic source S is obstacle polygon P(3). The visible side of such polygon is side $Sd_3(2)$. In FIGS. 8A and 8B, the procedure for determining the first order reflection visibility polygon for the visible side $Sd_3(2)$, named VP(1, 0, 1) according to the notation defined above, is illustrated. First, an image source S' is determined at a position which is symmetric to the position of the electromagnetic source S with respect to visible side $Sd_3(2)$. Then, a fictitious shadow region A3' is determined as the region of points that are not visible from the image source S' due to the visible side $Sd_3(2)$. In order to geometrically represent this region, in FIG. 8A, a first straight line is projected from the position of the image source S' to the boundary of the world W, said first straight line going through the tail vertex of the visible side $Sd_3(2)$, and a second straight line is projected from the position of the image source S' to the boundary of the world W, said second straight line going through the head vertex of the visible side $Sd_3(2)$. The fictitious shadow region A3' is comprised within said first and second straight lines, the visible side $Sd_3(2)$ and the boundary of the world W. In FIG. 8A, the fictitious shadow region A3' comprises obstacle polygon P(1) and a portion of obstacle polygon P(2). This implies that steps a to c described above should be applied.

Sides $Sd_1(3)$, $Sd_1(4)$, $Sd_1(5)$ of obstacle polygon P(1), side $Sd_2(4)$ of obstacle polygon P(2) and a portion of side $Sd_2(3)$ of obstacle polygon P(2) that are visible from the image source S' are then considered and the further fictitious shadow regions associated to each of these sides or portion of sides are determined by applying the procedure described above with reference to the determination of the direct visibility polygon VP(0, 0, 0) (see FIG. 8B). The resulting first order reflection visibility polygon VP(1, 0, 1) is indicated as a dotted area in FIG. 8b.

Successively, the vertices of the first order reflection visibility polygon VP(1, 0, 1) are identified. Specifically, a first vertex is arbitrarily chosen and the other vertices are preferably ordered according to a counter-clockwise direction along the boundary of the polygon (as represented by the arrows shown in FIG. 8B).

Figure 8C:
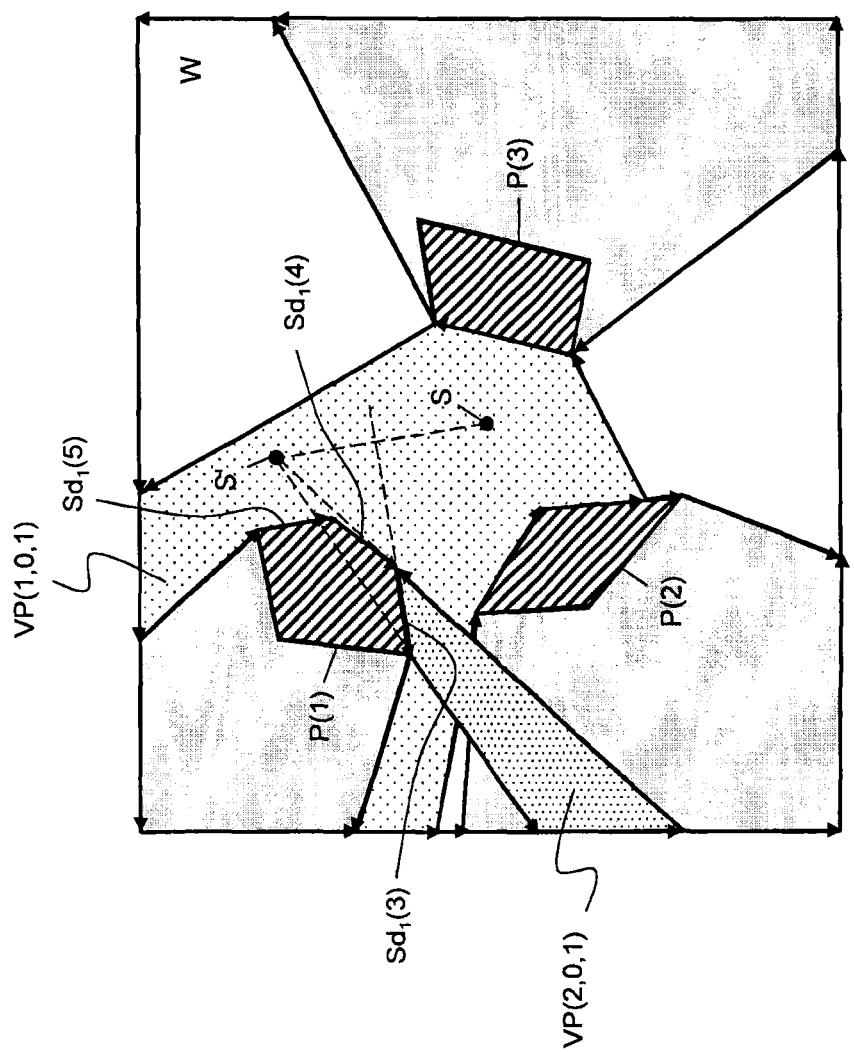

Again referring to FIG. 6, obstacle polygon P(1) is then considered. Obstacle polygon P(1) has three sides, namely sides $Sd_1(3)$, $Sd_1(4)$ and $Sd_1(5)$, that are visible from the electromagnetic source S. The procedure for determining the first order reflection visibility polygon VP(2, 0, 1) associated to visible side $Sd_1(3)$ is illustrated with reference to FIG. 8C. Specifically, an image source S' is identified at a position which is symmetric to the position of the electromagnetic source S with respect to side $Sd_1(3)$. Then, a fictitious shadow region A1' is determined as the region of points that are not visible from the position of the image source S' due to side $Sd_1(3)$. In order to geometrically represent this region, in FIG. 8C, a first straight line is projected from the position of the image source S' to the boundary of the world W, said first straight line going through the tail vertex of visible side $Sd_1(3)$, and a second straight line is projected from the position of the image source S' to the boundary of the world W, said second straight line going through the head vertex of visible side $Sd_1(3)$. The fictitious shadow region A1' is comprised within said first and second straight lines, the visible side $Sd_1(3)$ and the boundary of the world W. In the exemplary scenario of FIG. 8C this region does not comprise any other polygon P(2), P(3) or portion of polygon P(2), P(3) and thus it corresponds to the first order reflection visibility polygon VP(2, 0, 1) associated to visible side $Sd_1(3)$. First order reflection visibility polygon VP(2, 0, 1) is indicated as a dotted area in FIG. 8C.

The vertices of the first order reflection visibility polygon VP(2, 0, 1) are then identified. Specifically, a first vertex is arbitrarily chosen and the other vertices are then ordered so as to define a counter-clockwise direction along the boundary of the polygon (as represented by the arrows shown in FIG. 8C).

According to the flow chart of FIG. 4, after having determined the first order reflection visibility polygons VP(p, 0, 1), p=1, . . . , M, the reflection visibility polygons corresponding to the second order of reflection are then determined by increasing of 1 the index r, by setting the index p equal to 1 and by returning to step 123 (sub-step 126).

At sub-step 123 the condition r>R is verified again. If such condition is not verified (branch "no" of sub-step 123), sub-step 124 is performed again. Specifically, for computing the second order reflection visibility polygons VP(p, 0, 2), p=1, . . . M, at each iterated sub-step 124, the image source S' of the electromagnetic source S which has been identified for computing the corresponding first order reflection visibility polygon VP(p, 0, 1) is considered. In particular, the image sources S' are considered one-by-one by increasing of 1 the value of the index p, at sub-step 125, until the index p reaches the value M. For each image source S', the corresponding first order reflection visibility polygon VP(p, 0, 1) is considered and it is determined whether this polygon comprises sides (or portions of sides) of the obstacle polygons P(i). In the affirmative case, for each of such sides or portions of side, a second order reflection visibility polygon VP(p, 0, 2) corresponding to that particular side or portion of side is computed. Hence, for each image source S', a number of second order reflection visibility polygons VP(p, 0, 2) is determined, such number being equal to the number of sides (or portions of sides) of the obstacle polygons P(i) comprised within the first order reflection visibility polygon VP(p, 0, 1) associated to that image source S'. More in particular, for each image source S', a number of further image sources are determined with respect to all the sides (or portions of side) of the obstacle polygons P(i) comprised within the first order reflection visibility polygon VP(p, 0, 1) associated to that image source S'. Then the procedure applied for computing the first order reflection visibility polygons VP(p, 0, 1) is repeated with reference to the further image sources so as to compute the second order reflection visibility polygons VP(p, 0, 2) associated to each of said image source S'.

The operations described above are iterated for computing the reflection visibility polygons VP(p, 0, r) of higher orders of reflection till the maximum order of reflection R is reached (as represented by the branch "yes" of sub-step 123). At this point the procedure for determining the reflection visibility polygons ends (sub-step 127 of FIG. 4).

Newly with reference to step 12 of the flow chart of FIG. 2, the diffraction visibility polygons VP(p, 1, 0), p=1, . . . , N are then determined. In this case, index p is an incremental index whose value identifies each different diffraction visibility polygon. Specifically, index p is incremented each time a different diffraction visibility polygon is determined.

Firstly, a number of consecutive diffractions and a number of reflections after the diffraction are set equal to or higher than one. These numbers may be input into the hardware system HS by the operator through the input peripheral at the beginning of the computation. In the following, for simplicity, only a single diffraction and a single reflection after the diffraction will be considered (therefore, index d will be at most equal to one). However, higher number of diffractions and subsequent reflections may be considered as well.

Successively, a first set of diffraction visibility polygons VP(p, 1, 0) is determined, each diffraction visibility polygon VP(p, 1, 0) belonging to said first set being defined as the polygonal region within the world W whose points may be reached by the radio wave emitted by the electromagnetic source S after it has been diffracted at one edge (i.e. a corner) of an obstacle polygon P(i). The edges at the intersection of two sides (at least one of which being a visible side) that form a convex angle lower than a maximum angle equal, for instance to 150°, are preferably considered (in the following, these edges will be referred to as "diffraction edges").

Selecting the diffraction edges between the edges that form an angle preferably lower than 150° allows avoiding critical situation that may occur when the vector map of an urban area shows some inaccuracies. In fact, in an urban area two buildings that are adjacent and aligned along a road may have very close adjacent edges. In the vector map these two edges may be reported as a single edge between two sides that are at a mutual angle equal to or near to 180°. Selecting the maximum angle as indicated above advantageously allows avoiding to consider these edges as diffraction edges.

In the exemplary situation of FIG. 6, the diffraction edges are $V_1(1)$, $V_1(5)$, $V_1(4)$ and V1(3) for obstacle polygon P(1), $V_2(1)$, $V_2(4)$ and $V_2(3)$ for obstacle polygon P(2), and $V_3(2)$, $V_3(3)$ for obstacle polygon P(3).

For each diffraction edge, an equivalent source located at the edge is then considered and the diffraction visibility polygon VP(p, 1, 0) corresponding to that diffraction edge is computed as the direct visibility polygon of that equivalent source. The operations for computing the direct visibility polygons of the equivalent sources at the diffraction edges are the same as described above with reference to the computation of the direct visibility polygon of the electromagnetic source S and therefore they will not be repeated.

Further, a second set of diffraction visibility polygons VP(p, 1, 1) is determined, each diffraction visibility polygons VP(p, 1, 1) belonging to said second set being defined as the polygonal region within the world W whose points may be reached by the radio wave emitted by the electromagnetic source S after it has been diffracted at a diffraction edge and then reflected once by the sides of the obstacle polygons P(i). These sides are the sides of the obstacle polygons P(i) which are "in line of sight" with the equivalent source at the diffraction edge. The procedure for computing such second set of diffraction visibility polygons VP(p, 1, 1) is the same as described above for computing the first order reflection visibility polygons. In fact, each diffraction visibility polygons VP(p, 1, 1) belonging to said second set corresponds to a first order reflection visibility polygon for which the electromagnetic source S is replaced by the equivalent source at the diffraction edge. Higher orders of reflection may also be considered, in the same manner as above.

The vertices of each diffraction visibility polygon VP(p, 1, 0), VP(p, 1, 1) computed by means of the procedure described above are then identified. Specifically, a first vertex of each diffraction visibility polygon VP(p, 1, 0), VP(p, 1, 1) is arbitrarily chosen and the other vertices are preferably ordered according to a counter-clockwise direction along the boundary of the polygon.

Again with reference to FIG. 2, at the end of step 12, the processing module PM has determined a number K of visibility polygons VP(k), k=1, . . . , K where each value of index k univocally corresponds to a triplet p, d, r. K is an integer number higher than or equal to 1. Data relating to each visibility polygon VP(k) computed at step 12 are preferably stored in the database DB. Such data preferably comprise, for each visibility polygon VP(k):

the Cartesian coordinates of the electromagnetic source from which the points belonging to the visibility polygon are "visible", which is also referred to, in the following, as the electromagnetic source associated to that visibility polygon: for the direct visibility polygon VP(0, 0, 0) such source corresponds to the electromagnetic source S, for a reflection visibility polygon such source is the corresponding image source S', for a diffraction visibility polygon such source is the corresponding equivalent source;

the Cartesian coordinates of the vertices of the visibility polygon VP(k).

At step 13, the processing module PM preferably subdivides the world W in a plurality of pixels P. The pixels P have preferably square shape and they have preferably the same area. Preferably, the length of each pixel's side ranges between about 1 m and about 10 m. More preferably, the length of each pixel's side is equal to 1 m. Each pixel has a geometric center whose coordinates are defined within the Cartesian plane represented in FIG. 5. The Cartesian coordinates of the pixels are preferably store in the database DB.

At step 14, the processing module PM sets the index k equal to 1. Then at step 15 the processing module PM verifies if the condition k>K is satisfied. If the condition k>K is not satisfied (branch "no" of step 15), as the case of k=1, the processing module PM performs step 16.

At step 16, the processing module PM scans the visibility polygon VP(1) and, for this visibility polygon, it determines the pixels of the world W belonging to it.

At step 17 the index k is increased of 1 and the condition k>K is verified again by returning at step 15.

If the condition k>K is not satisfied, step 16 is performed again.

Specifically, at each iterated step 16, a visibility polygon VP(k), k=1, . . . K, is scanned and, for this visibility polygon, the pixels of the world W belonging to it are determined. Preferably, the visibility polygons VP(k) are scanned according to a predetermined order. Preferably, the processing module PM scans the direct visibility polygon VP(0, 0, 0) first, then the reflection visibility polygons VP(p, 0, r) and finally the diffraction visibility polygons VP(p, d, r). In order to determine the pixels of the world W belonging to a visibility polygon VP(k), the processing module PM preferably retrieves from the database DB the information concerning the vertices of the visibility polygon VP(k) and then it determines the boundary of the visibility polygon VP(k). Successively, the processing module PM preferably scans the pixels of the world W and it determines if the geometric center of each pixel is inside or outside the boundary of the considered visibility polygon.

When the condition k>K is satisfied (branch "yes" of step 15), the processing module PM performs step 18 by setting equal to 1 the index k. Then, at step 19, the processing module PM verifies again if the condition k>K is satisfied. If the condition k>K is not satisfied (branch "no" of step 19), as the case of k=1, the processing module PM performs step 20.

At step 20, the processing module PM preferably computes the electric field value and the electric field strength associated to each pixel of the scanned visibility polygon VP(1) by retrieving from the database DB the data concerning the electromagnetic properties of the electromagnetic source S (for instance, the radiation pattern) and the coordinates of the pixels, and by applying the equations described herein after.

At step 21 the index k is increased of 1 and the condition k>K is verified again by returning at step 19.

If the condition k>K is not satisfied, step 20 is performed again. Specifically, step 20 is repeated for all the visibility polygons VP(k) k=1, . . . K until the condition k>K is satisfied (branch "yes" of step 19). When the condition k>K is satisfied the process ends (step 22)

It should be noted that the electric field strength at each pixel may result as the sum of different electric field values according to the fact that a pixel may belong to more than one visibility polygon, as it will be described in better detail further below.

For computing the electric field value associated to a considered pixel it is assumed that the electromagnetic source emits a radio wave having transverse polarization, i.e. the polarization is orthogonal with respect to the ground. For a radio base station in a micro-cellular network, the transverse polarization coincides with the vertical polarization.

Specifically, for each pixel of the direct visibility polygon VP(0, 0, 0), a first component of the electric field value at that pixel, namely the component of the electric field that is due to the direct visibility path of the radio wave emitted by the electromagnetic source S, may be computed according to the following equation:

$$E_{00}(1) = Ein \cdot G \cdot e^{j\frac{2\pi}{\lambda}d1} \cdot \left(\frac{1}{d1}\right)^{h(f)} \quad [1]$$

where $E_{00}(1)$ designates the first component of the electric field value at the considered pixel, Ein is the value of the electric field at a unitary distance from the electromagnetic source S, e.g. at a distance of 1 m, and depends on the power transmitted by the electromagnetic source S, G is the value of the radiation pattern of the electromagnetic source S in the direction of the considered pixel, $\lambda$ is the wavelength of the radio wave emitted by the electromagnetic source S, d1 is the Euclidean distance between the electromagnetic source S and the geometric center of the considered pixel computed along the direction of propagation of the radio wave and h(f) is a propagation exponent having a fixed value, e.g. 1.18.

Successively, a second component of the electric field value at the considered pixel may be computed, namely the component which is due to the reflection by the ground of the radio wave emitted by the electromagnetic source S, according to the following equation:

$$E_{00}(2) = Ein \cdot G \cdot R_V \cdot e^{j\frac{2\pi}{\lambda}d2} \cdot \left(\frac{1}{d2}\right)^{h(f)} \quad [2]$$

wherein $E_{00}(2)$ designates the second component of the electric field value at the considered pixel after the radio wave emitted by the electromagnetic source S has been reflected by the ground, $R_V$ is the Fresnel reflection coefficient related to the reflection on the ground of the transverse polarization, and d2 is the distance between the electromagnetic source S and the geometric center of the considered pixel computed along the direction of propagation of the radio wave reflected by the ground, i.e. the sum of the distance between the electromagnetic source S and the ground and the distance between the ground and the geometric center of the pixel along the direction of propagation of the radio wave.

The electric field value associated to the direct visibility polygon VP(0, 0, 0) at the considered pixel is the sum of said first and second components:

$$E_{00} = E_{00}(1) + E_{00}(2). \quad [3]$$

The reflection visibility polygons VP(p, 0, r) are then considered, according to an ascending order of reflection (before the first order reflection visibility polygons VP(p, 0, 1), then the second order reflection visibility polygons VP(p, 0, 2) and so on).

For each reflection visibility polygon VP(p, 0, r) and for each pixel within such polygon, a first component of the electric field value at that pixel, namely the component of the electric field value which is due to the reflections of the radio wave by the visible sides of the obstacles, may be computed according to the following equation:

$$E_{0r}(1) = Ein \cdot G \cdot \left( \prod_{l=1}^{r} R_H(l) \right) \cdot e^{j\frac{2\pi}{\lambda}d3} \cdot \left( \frac{1}{d3} \right)^{h(f)} \quad [4]$$

wherein $E_{0r}(1)$ designates the first component of the electric field value at the considered pixel, $R_H(I)$, $I=1, \ldots, r$ are the Fresnel reflection coefficients related to the reflections undergone by the radio wave on the visible sides of the obstacles and d3 is the distance between the electromagnetic source S and the geometric center of the considered pixel computed along the direction of propagation of the radio wave successively reflected by the visible sides of the obstacles, i.e. the sum of the distance between the electromagnetic source S and the visible side of the obstacle on which the first reflection takes place, the distance between the visible side of the obstacle on which the first reflection takes place and the visible side of the obstacle on which the second reflection takes place, and so on until the distance between the visible side of the obstacle on which the last reflection takes place and the geometric center of the pixel. It should be noted that the radio wave emitted by the electromagnetic source has a transverse polarization with respect to the ground and a parallel polarization with respect to the sides of the obstacles. The Fresnel coefficients considered in equation [4] are accordingly the Fresnel coefficients related to the reflection on the sides of the parallel polarization.

Then, also a second component of the electric field value at the considered pixel may be computed, namely the component which is due to the reflections of the radio wave by the visible sides of the obstacles and by the ground, according to the following equation:

$$E_{0r}(2) = Ein \cdot G \cdot \left( \prod_{k=1}^{r} R_H(k) \right) \cdot R_V \cdot e^{j\frac{2\pi}{\lambda}d4} \cdot \left( \frac{1}{d4} \right)^{h(f)} \quad [5]$$

wherein $E_{0r}(2)$ designates the second component of the electric field value at the considered pixel after the reflections of the radio wave on the visible sides of the obstacle and on the ground, $R_H(k)$, $k=1, \ldots, r$ are the Fresnel reflection coefficients related to the reflections undergone by the radio wave on the ground and d4 is the distance between the electromagnetic source S and the geometric center of the pixel along the direction of propagation of the radio wave reflected by the visible sides of the obstacles and by the ground. Reflection by the ground may take place between any two successive reflections by the visible sides of the obstacles or after the last reflection.

The electric field value associated to each reflection visibility polygon VP(p, 0, r) at the considered pixel is then computed by performing the sum of said first and second components:

$$E^P_{0r} = E_{0r}(1) + E_{0r}(2). \quad [6]$$

Next, the diffraction visibility polygons VP(p, d, r) are considered.

First, the diffraction visibility polygon VP(p, 1, 0) is considered, namely the diffraction visibility polygon in which the electric field is due only to diffraction, without any successive reflection from the visible sides of the obstacles. For each pixel within such diffraction visibility polygon, a first component of the electric field value, namely the component of the electric field value which is due to the diffraction of the radio wave emitted by the equivalent electromagnetic source at a diffraction edge may be computed, according to the following equation:

$$E_{10}(1) = Ein \cdot G \cdot e^{j\frac{2\pi}{\lambda}d5} \cdot \left( \frac{1}{d5} \right)^{h(f)} \cdot D \cdot e^{j\frac{2\pi}{\lambda}d6} \cdot \left( \sqrt{\frac{d5}{d6 \cdot (d5+d6)}} \right)^{h(f)} \quad [7]$$

wherein $E_{10}(1)$ is the first component of the electric field value at the considered pixel, D is the diffraction coefficient corresponding to the considered diffraction edge, d5 is the distance between the electromagnetic source S and the considered diffraction edge along the direction of propagation of the radio wave and d6 is the distance between the considered diffraction edge and the geometric center of the considered pixel along the direction of propagation of the radio wave.

Then, also a second component of the electric field value at the considered pixel may be computed, namely the component which is due to the diffraction of the radio wave by a diffraction edge and a reflection due to the ground, according to the following equation:

$$E_{10}(2) = \quad [8]$$
$$Ein \cdot G \cdot e^{j\frac{2\pi}{\lambda}d5} \cdot \left( \frac{1}{d5} \right)^{h(f)} \cdot D \cdot R_V \cdot e^{j\frac{2\pi}{\lambda}d6} \cdot \left( \sqrt{\frac{d5}{d7 \cdot (d5+d7)}} \right)^{h(f)}$$

wherein $E_{10}(2)$ designates the second component of the electric field value at the considered pixel, and d7 is the distance between the diffraction edge and the geometric center of the pixel computed as the sum of the distance between the diffraction edge and the ground and the distance between the ground and the geometric center of the pixel, along the direction of propagation of the radio wave.

The electric field value associated to each diffraction visibility polygon VP(p, 1, 0) at the considered pixel is computed by performing the sum of said first and second components:

$$E^P_{10} = E_{10}(1) + E_{10}(2). \quad [9]$$

Further, the diffraction visibility polygons VP(p, 1, 1) are considered, namely the diffraction visibility polygons in which the electric field value is due to a diffraction and to a successive reflection by a visible side of an obstacle. For each pixel within such diffraction visibility polygon, a first component of the electric field value, namely the component of the electric field value which is due to the diffraction and to a successive reflection of the radio wave emitted by the equivalent electromagnetic source at a diffraction edge may be computed, according to the following equation:

$$E_{11}(1) = \qquad [10]$$
$$Ein \cdot G \cdot e^{j\frac{2\pi}{\lambda}d5} \cdot \left(\frac{1}{d5}\right)^{h(f)} \cdot D \cdot R_H \cdot e^{j\frac{2\pi}{\lambda}d7} \cdot \left(\sqrt{\frac{d5}{d8 \cdot (d5+d8)}}\right)^{h(f)}$$

wherein $E_{11}(1)$ designates the first component of the electric field value at the considered pixel, D is the diffraction coefficient corresponding to the considered diffraction edge, $R_H$ is the Fresnel reflection coefficient related to the reflection undergone by the radio wave on the visible side of the obstacle, d5 is the distance between the electromagnetic source S and the considered diffraction edge along the direction of propagation of the radio wave and d8 is the distance between the considered diffraction edge and the geometric center of the considered pixel along the direction of propagation of the radio wave.

Then, also a second component of the electric field value at the considered pixel may be computed, namely the component which is due to the diffraction of the radio wave by a diffraction edge followed by a reflection from the visible side of the obstacle, and a further reflection due to the ground, according to the following equation:

$$E_{11}(2) = Ein \cdot G \cdot e^{j\frac{2\pi}{\lambda}d5} \cdot \left(\frac{1}{d5}\right)^{h(f)} \cdot \qquad [11]$$
$$D \cdot R_H \cdot R_V \cdot e^{j\frac{2\pi}{\lambda}d8} \cdot \left(\sqrt{\frac{d5}{d9 \cdot (d5+d9)}}\right)^{h(f)}$$

wherein $E_{11}(2)$ designates the second component of the electric field value at the considered pixel, and d9 is the distance between the diffraction edge and the geometric center of the pixel computed as the sum of the distance between the diffraction edge and the visible side of the obstacle on which the reflection takes place, the distance between this visible side and the ground and the distance between the ground and the geometric center of the pixel, along the direction of propagation of the radio wave, or computed as the sum of the distance between the diffraction edge and the ground, the distance between the ground and the visible side of the obstacle on which the reflection takes place and the distance between the visible side and the geometric center of the pixel, along the direction of propagation of the radio wave. Depending on the relative positions of the diffraction edge and the visible side of the obstacle on which the reflection takes place, the reflection by the ground may indeed takes place after the diffraction and the successive reflection of the radio wave by the visible side, or after the diffraction but before the successive reflection.

The electric field value associated to each diffraction visibility polygon VP(p, 1, 1) at the considered pixel is computed by performing the sum of said first and second components:

$$E^P{}_{11} = E_{11}(1) + E_{11}(2). \qquad [12]$$

Figure 9:
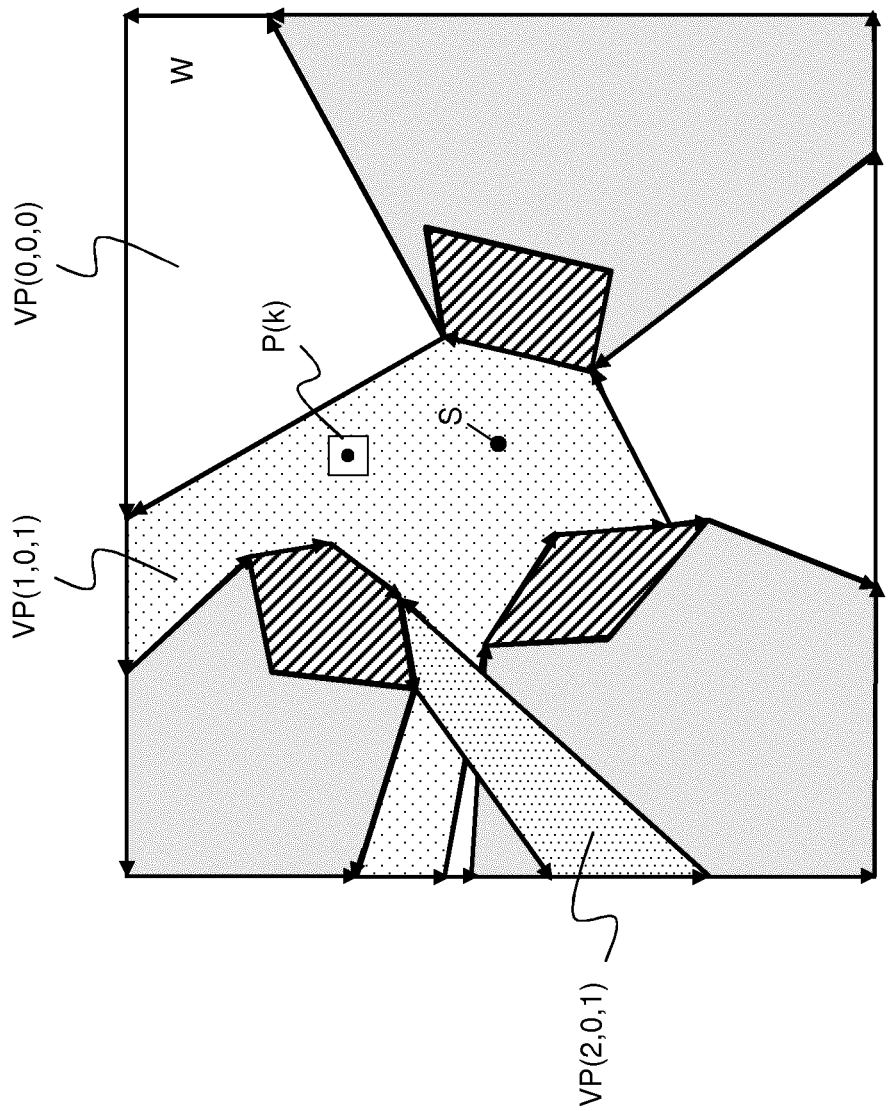
FIG. 9 shows some visibility polygons and a pixel within the area of investigation, for illustrating the step of computing the electric field strength within said pixel.

With reference to the exemplary scenario of FIG. 9 and to steps 20-21 of FIG. 2, the computation of the electric field value E associated to a considered pixel P of the world W will be now described. In the following, it is assumed that the pixel P belongs to the direct visibility polygon VP(0, 0, 0), to the first order reflection visibility polygon VP(1, 0, 1), to the second order reflection visibility polygon VP(2, 0, 1) and to a diffraction visibility polygon VP(1, 1, 0) (not shown in FIG. 9).

As already described above, at step 20, all the pixels belonging to the direct visibility polygon VP(0, 0, 0) are scanned and the component $E_{00}$ of the electric field value at the considered pixel P due to this polygon is computed according to equations [1], [2] and [3].

Successively, the first order reflection visibility polygon VP(1, 0, 1) is considered by iterating step 20. Specifically, at the iterated step 20, all the pixels belonging to the first order reflection visibility polygon VP(1, 0, 1) are scanned and the component $E^1{}_{01}$ of the electric field at the considered pixel P due to this polygon is computed according to equations [4], [5] and [6].

Next, the second order reflection visibility polygon VP(2, 0, 1) is considered by iterating step 20 again. At the iterated step 20, all the pixels belonging to the second order reflection visibility polygon VP(2, 0, 1) are scanned and the component $E^2{}_{01}$ of the electric field value at the considered pixel P due to this polygon is computed according to equations [4], [5] and [6].

Finally, the diffraction visibility polygon VP(1, 1, 0) is considered by iterating step 20 again. At the iterated step 20, all the pixels belonging to the diffraction visibility polygon VP(1, 1, 0) are scanned and the component $E^1{}_{10}$ of the electric field value at the considered pixel P due to this polygon is computed according to equations [7], [8] and [9].

According to the present invention the electric field value E at the considered pixel P is therefore equal to the sum $E = E_{00} + E^1{}_{01} + E^2{}_{01} + E^1{}_{10}$ that is the sum of all the components of the electric field due to each visibility polygon to which the pixel P belongs.

Finally, the electric field strength at the considered pixel P may be computed as the square root of the sum of the power associated to the electric field values due to the direct visibility polygon and to the reflection visibility polygons, and the power associated to the electric field value due to the diffraction visibility polygon:

$$\sqrt{(|E_{00} + E^1_{01} + E^2_{01}|^2 + |E^1_{10}|^2)}.$$

Once all the pixels P belonging to all the visibility polygons VP(k), k=1, ..., K of the world W have been considered and the value of the electric field strength at each pixel P is determined, such values are then preferably written in a matrix and stored in the database DB.

Then, the matrix containing the electric field strength values computed according to the present invention are then forwarded to the output module OM of FIG. 1. The output module OM processes these values in order to provide a map of the electric field values inside the world W. The map may be displayed to the operator on the display of the hardware system HS. Such map may be a colored map or a gray-scale map in which each color or gray tone is associated to a range of the electric field strength within the world W. Typically, such map may be superimposed to the map of the obstacles within the world W, so that the operator may have an easy visualization of the radio wave propagation in the space between the obstacles.

As it is clear from the above, the method according to the present invention is more efficient, from a computational point of view, than the "traditional" techniques such as for example the ray tracing. In fact, similarly to the ray-tracing technique, the method of the present invention allows computing the electric field strength at a very high number of points belonging to an investigated area. The spatial resolution achievable by such method is therefore comparable to that achievable by the ray tracing technique. However, the method according to the present invention is more advantageous than the ray tracing technique because it does not envisage to scan all the points of the investigated area so as to determine all the possible propagation paths between the electromagnetic source and the considered points. This is due to the introduction of the concept of visibility polygons (representing the visibility areas of the electromagnetic source and of the equivalent sources) that allows scanning only the points belonging to such visibility polygons instead of all the points of the investigated area, the number of such visibility polygons being much lower than the number of points of the area. This results in a great reduction of the computing time and of the amount of computational resources needed to perform the estimation of the electric field strength with respect to the ray tracing technique.

The invention claimed is:

1. A method for estimating electric field strength associated to a radio wave emitted by an electromagnetic source of a cellular radio communication network, within an area of investigation, the method comprising:
    a) identifying a set of obstacles within the area of investigation;
    b) determining a direct visibility polygon as a polygonal region within a two-dimensional area associated with the area of investigation, the direct visibility polygon being a two-dimensional polygon and comprising only points in the two-dimensional area which are reached by the radio wave emitted by the electromagnetic source along a direct propagation path without any obstacles, and after determining the direct visibility polygon, determining at least one of:
        a reflection visibility polygon as a polygonal region within the two-dimensional area comprising points that may be reached by the radio wave after it has been reflected by at least one of the obstacles, and
        a diffraction visibility polygon as a polygonal region within the two-dimensional area comprising points that may be reached by the radio wave after the radio wave has been diffracted by at least one of the obstacles,
    wherein the direct visibility polygon, the reflection visibility polygon, and the diffraction visibility polygon are associated to respective values of the electric field computed therein;
    c) subdividing the area of investigation into a set of pixels;
    d) for each pixel of the set, determining if the pixel belongs to at least one of the visibility polygons; and
    e) in affirmative of the determining, determining electric field strength at the considered pixel as a value proportional to the value of the electric field computed at the at least one visibility polygon.

2. The method according to claim 1, wherein a) comprises:
    associating to each of the obstacles a respective obstacle polygon, each obstacle polygon being a two-dimensional polygon whose perimeter corresponds to an external boundary of the corresponding obstacle;
    computing, for each obstacle polygon, a distance from the electromagnetic source; and
    ordering the obstacle polygons according to increasing values of the computed distance.

3. The method according to claim 2, wherein a) further comprises:
    determining a set of vertices for each of the obstacle polygons within the two-dimensional area; and
    ordering the vertices according to a direction along a boundary of the obstacle polygon.

4. The method according to claim 3, wherein b) comprises determining one or more visible sides of the obstacle polygons, each one of the visible sides being a side in line of sight with the electromagnetic source.

5. The method according to claim 4, wherein the at least one direct visibility polygon is determined by:
    computing, for each visible side of the obstacle polygons that is in line of sight with the electromagnetic source, a shadow region as the region of points that are not visible from the electromagnetic source due to the considered visible side;
    determining the direct visibility polygon as the region of points which do not belong to any one of the shadow region.

6. The method according to claim 5, wherein the computing is performed by considering the obstacle polygons according to increasing values of their distance from the electromagnetic source.

7. The method according to claim 4, wherein the at least one reflection visibility polygon is determined by:
    determining, for each one of the visible sides, an image source located at a position which is symmetric to the position of the electromagnetic source with respect to the considered visible side;
    determining a fictitious shadow region as the region of points that are not visible from the image source due to the considered visible side;
    determining, in the fictitious shadow region, sides or portions of sides of the obstacle polygons that are visible from the image source;
    for each one of the identified sides or portions of side visible from the image source, determining a further fictitious shadow region as the region of points that are not visible from the image source due to the considered side or portion of side; and
    determining the reflection visibility polygon as the region of points of the fictitious shadow region which do not belong to the further fictitious shadow regions.

8. The method according to claim 4, wherein the at least one diffraction visibility polygon is determined by:
    identifying at least one diffraction edge of at least one of the obstacle polygons;
    associating the diffraction edge to an equivalent electromagnetic source;
    determining at least one visible side of the obstacle polygons that is in line of sight with the equivalent electromagnetic source;
    computing, for the at least one visible side of the obstacle polygons, a shadow region as the region of points that are not visible from the equivalent electromagnetic source due to the at least one visible side;
    determining the diffraction visibility polygon as the region of points which do not belong to the shadow region.

9. The method according to claim 8, wherein the identifying comprises identifying the at least one diffraction edge as an edge between two sides of an obstacle polygon forming a convex angle lower than 150°.

10. The method according to claim 1, further comprising displaying a map of the computed electric field strength inside the area of investigation.

11. A non-transitory computer program product comprising computer-executable instructions for performing, when the program is run on a computer, the method according to claim 1.

12. A system for estimating electric field strength associated to a radio wave emitted by an electromagnetic source of a cellular radio communication network within an area of investigation, the system comprising:

a processor configured to:

identify a set of obstacles within the area of investigation;

determine a direct visibility polygon as a polygonal region within a two-dimensional area associated with the area of investigation, the direct visibility polygon being a two-dimensional polygon and comprising only points in the two-dimensional area which are reached by the radio wave emitted by the electromagnetic source along a direct propagation path without any obstacles, and after determining the direct visibility polygon, determine at least one of:

a reflection visibility polygon as a polygonal region within the two-dimensional area comprising points that may be reached by the radio wave after the radio wave has been reflected by at least one of the obstacles, and a diffraction visibility polygon as a polygonal region within the two-dimensional area comprising points that may be reached by the radio wave after it has been diffracted by at least one of the obstacles, wherein the direct visibility polygon, the reflection visibility polygon, and the diffraction visibility polygon are associated to respective values of the electric field computed therein;

subdivide the area of investigation into a set of pixels;

for each pixel of the set, determine if the pixel belongs to at least one of the visibility polygons; and in affirmative of the determine, determine electric field strength at the considered pixel as a value proportional to the value of the electric field computed at the at least one visibility polygon.

13. The system according to claim 12, further comprising an output module configured to provide a map of the computed electric field strength inside the area of investigation.

* * * * *